April 22, 1958   F. W. LA VISTA   2,831,522
SHAPED BLOCK AND CLAMP ARMS FOR SHAPING PLATES
Filed May 9, 1955   2 Sheets-Sheet 1

INVENTOR
FRANK W. LA VISTA
BY E. W. Marshall
ATTORNEY

April 22, 1958 F. W. LA VISTA 2,831,522
SHAPED BLOCK AND CLAMP ARMS FOR SHAPING PLATES
Filed May 9, 1955 2 Sheets-Sheet 2

INVENTOR
FRANK W. LA VISTA
BY E. W. Marshall
ATTORNEY

United States Patent Office 2,831,522
Patented Apr. 22, 1958

2,831,522
SHAPED BLOCK AND CLAMP ARMS FOR SHAPING PLATES

Frank W. La Vista, Garden City, N. Y., assignor to Liberty Products Corporation, Farmingdale, N. Y., a corporation of New York Application May 9, 1955, Serial No. 506,703
11 Claims. (Cl. 153—32)

This invention relates to a means for shaping plates of metal or other thin material such as, for example, those used to form parts of airplanes or of automobile bodies. It relates also to a means for alining a plurality of interconnected plates of this character. It relates more particularly to a novel form of clamp which in connection with a shaping block, may be used to expedite the use of the aforesaid operation.

Referring to the drawings.

Similar parts in all of the figures are designated by like reference numerals.

10 designates a shaping block, the outer surface of which is formed to correspond to the desired form of the inner surface of the finished plates. Near its lower edges are a plurality of spaced bores 11.

20A, 20B, 20C and 20D designate the plates interconnected, for example by rivets 21. These are bent to approximately the form of the shaping block 10. Near their lower edges are perforations 22, spaced to register with the bores 11 in the shaping block.

30 designates one of the clamps. There are several of these clamps, for example, one for each of the plates 20A, 20B, 20C and 20D.

Figure 1:
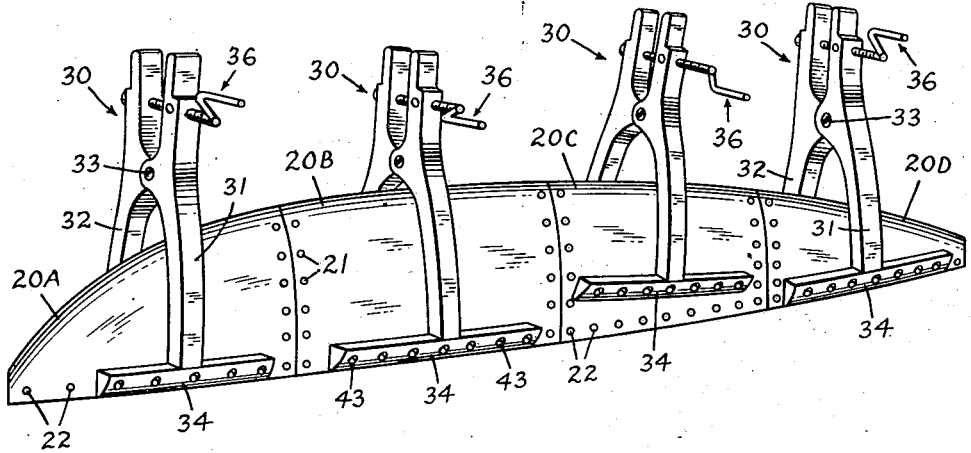
Fig. 1 is a perspective elevation showing a series of interconnected plates superimposed upon a shaping block with two of the plates forced onto the block by clamps which are made according to and embody my invention and another clamp of similar construction shown partly open.
Figure 2:
Fig. 2 is an inverted plan view of the shaping block shown in Fig. 1.
Figure 3:
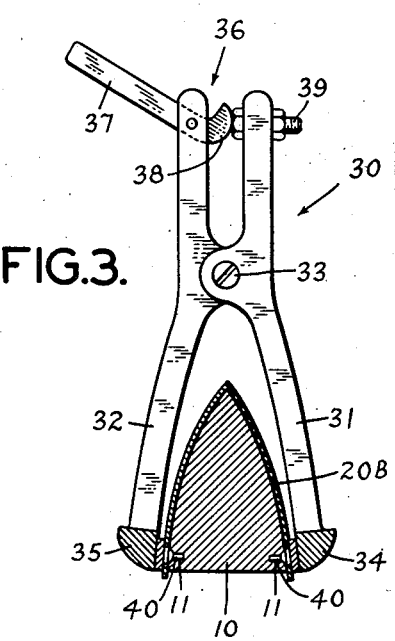
Fig. 3 is a transverse view of one of the clamps in tightened position with portions thereof in section and with the shaping block and one of the shaped plates shown in section.
Figure 4:
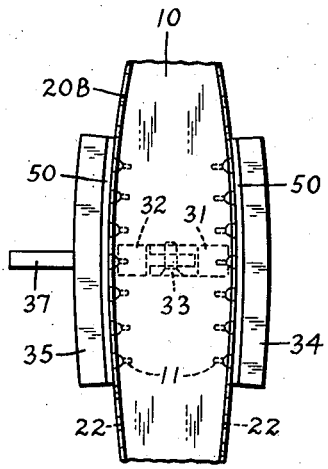
Fig. 4 is an inverted plan view of the parts shown in Fig. 3.

31 and 32 designate arms which are pivoted together as shown at 33. From the lower ends of these arms, jaws 34, 35 extend normally. Above the pivot is a mechanism designated generally by the reference numeral 36. That shown in Fig. 1 differs from that shown in Fig. 3. As the latter is what I now consider a preferred form, I will describe it specifically.

It comprises a lever 37, pivoted to the arm 32 near its upper end. The inner end of this lever forms a cam 38 which is arranged to engage the flat head of a bolt 39 which is in adjustable threaded engagement with the arm 31 near its upper end. When the lever 37 is depressed, the jaws 34, 35 are forced into engagement with one of the plates on the shaping block.

Figure 5:
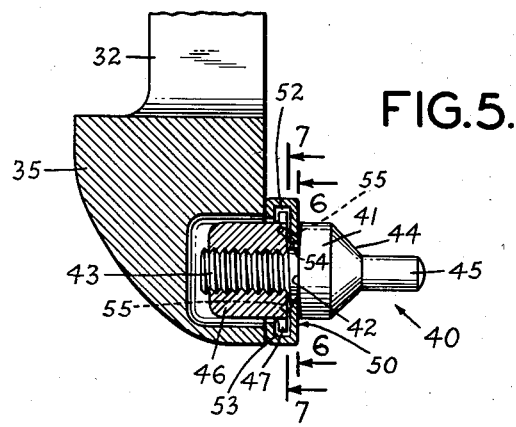
Fig. 5 is a transverse elevation on an enlarged scale of one of the pins in the jaws of the clamps with its associated parts shown in sections.
Figure 6:
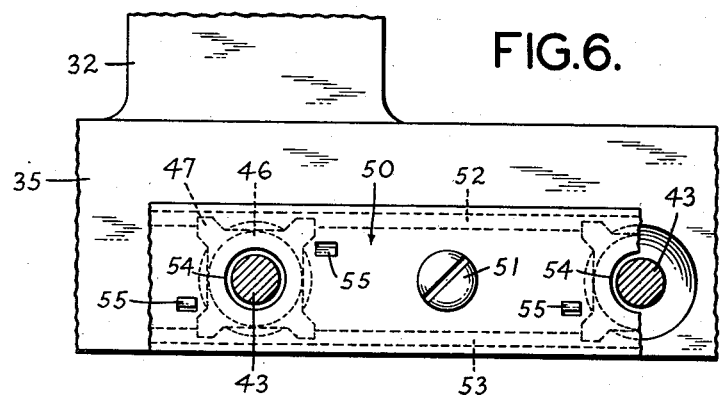
Fig. 6 and Fig. 7 are sectional elevations of the parts shown in Fig. 5, the sections being taken on the lines 6—6 and 7—7 respectively of the latter figure.
Figure 7:
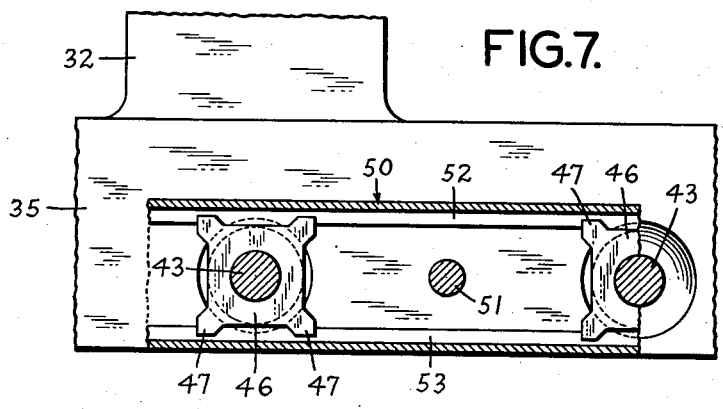

A plurality of pins 40 project inwardly from both of the jaws. These are spaced apart to register approximately with the perforations in the plates and the bores in the shaping block. They are however capable of limited transverse movements. A construction which provides for these desired movements is illustrated in Figs. 5–7.

Each pin comprises an intermediate enlarged cylindrical body 41 having a plane surface 42 from which extends an externally threaded stem 43. The body has a truncated, conical portion from the smaller end of which extends a cylindrical portion 45.

The threaded stem 43 is screwed into a nut 46, from the outer end of which are flat projecting flanges 47.

50 is a guide strip which is secured to the jaw 35 by screws 51. The edges of the strip are bent over to form channels, 52, 53 in which the flanges 47 slide. 54 designates clearance holes for the stems 43. Portions of this strip, shown at 55, are struck up to limit the longitudinal movement of the nuts 43.

A plate with spaced perforations near its edges is first bent to approximately the desired shape. It is then placed on the shaping block and a clamp with its pins passing through the perforations in the plate is applied. As the jaws of the clamp are forced inwardly, its pins enter the bores in this shaping block. The conical portions of the pins engaging the perforations in the plate stretch the plate tightly onto the shaping block.

This invention is especially useful for shaping a plurality of interconnected plates as the plates become perfectly alined as well as stretched to desired shapes.

I am aware of the fact that plates with perforated edges have been stretched over rigid shaping blocks by individual screws or by individual clamping devices, but by device facilitates such operations and produces better results because the entire edges of each plate are acted upon simultaneously.

Various modifications in construction, mode of operation, method and use of an invention may and do occur to others, especially after benefitting from knowledge of such disclosures as that herein presented of the principles involved, but the invention itself is not confined to the present showing.

I claim:

1. A shaping block having a surface shaped to conform to the desired form of a plate to be placed thereon, and opposite edges at the base of said surface, said block being provided with a plurality of spaced bores near both of said edges, combined with a clamp comprising a pair of arms pivoted together intermediate their ends, each of said arms having a jaw extending normally from its lower end, means near the upper ends of the arms for forcing the jaws toward the shaping block and a plurality of pins projecting inwardly from the jaws spaced to register with the bores in the shaping block.

2. A shaping block having a surface shaped to conform to the desired form of a plate to be placed thereon, and opposite edges at the base of said surface, said block being provided with a plurality of spaced bores near both of said edges, a plate provided with perforations near opposite edges thereof, spaced to correspond to the positions of said bores, combined with a clamp comprising a pair of arms pivoted together intermediate their ends, each of said arms having a jaw extending normally from its lower end, means near the upper ends of the arms for forcing the jaws toward the shaping block and a plurality of pins projecting inwardly from the jaws spaced to pass through the perforations in the plate and to register with the bores in the shaping block.

3. A shaping block having a surface shaped to conform to the desired form of plates to be placed thereon, and opposite edges at the base of said surface, said block being provided with a plurality of spaced bores near both of said edges, a plurality of interconnected plates provided with perforations near opposite edges thereof, spaced to correspond to the positions of said bores, combined with clamps each comprising a pair of arms pivoted together intermediate their ends, each of said arms having a jaw extending normally from its lower end, means near the upper ends of the arms for forcing the jaws toward the shaping block and a plurality of pins projecting inwardly from the jaws, spaced to pass through the perforations in the plates and to register with the bores in the shaping block.

4. A shaping block having a surface shaped to conform to the desired form of a plate to be placed thereon, and opposite edges at the base of said surface, said block being provided with a plurality of spaced bores near both of said edges, combined with a clamp comprising a pair of arms pivoted together intermediate their ends, each of said arms having a jaw extending normally from its lower end, means near the upper ends of the arms for forcing the jaws toward the shaping block and a plurality of pins projecting inwardly from the jaws, spaced to register with the bores in the shaping block, said pins being mounted to have limited lateral movements on the jaws.

5. A shaping block having a surface shaped to conform to the desired form of a plate to be placed thereon, and opposite edges at the base of said surface, said block being provided with a plurality of spaced bores near both of said edges, combined with a clamp comprising a pair of arms pivoted together intermediate their ends, each of said arms having a jaw extending normally from its lower end, means near the upper ends of the arms for forcing the jaws toward the shaping block and a plurality of pins projecting inwardly from the jaws, spaced to register with the bores in the shaping block, said pins having body portions bearing on the jaws, intermediate truncated conical portions and cylindrical portions projecting from the smaller end of the truncated conical portion arranged to pass into the bores in the shaping block.

6. A shaping block having a surface shaped to conform to the desired form of a plate to be placed thereon, and opposite edges at the base of said surface, said block being provided with a plurality of spaced bores near both of said edges, a plate provided with perforations near opposite edges thereof, spaced to correspond to the positions of said bores, combined with a clamp comprising a pair of arms pivoted together intermediate their ends, each of said arms having a jaw extending normally from its lower end, means near the upper ends of the arms for forcing the jaws toward the shaping block and a plurality of pins projecting inwardly from the jaws, spaced to pass through the perforations in the plate and to register with the bores in the shaping block, said pins having a body portion bearing on the jaws, intermediate truncated conical portions and cylindrical portions projecting from the smaller end of the truncated conical portion arranged to pass through the perforations in the plate and into the bores in the shaping block.

7. A shaping block having a surface shaped to conform to the desired form of a plate to be placed thereon, and opposite edges at the base of said surface, said block being provided with a plurality of spaced bores near both of said edges, combined with a clamp comprising a pair of arms pivoted together intermediate their ends, each of said arms havnig a jaw extending normally from its lower end shaped to correspond to the contour of opposite parts of the shaping block in which the bores are located and means near the upper ends of the arms for forcing the jaws toward the shaping block and a plurality of pins projecting inwardly from the jaws spaced to register with the bores in the shaping block.

8. A shaping block having a surface shaped to conform to the desired form of a plate to be placed thereon, and opposite edges at the base of said surface, said block being provided with a plurality of spaced bores near both of said edges, a plate provided with perforations near opposite edges thereof, spaced to correspond to the positions of said bores, combined with a clamp comprising a pair of arms pivoted together intermediate their ends, each of said arms having a jaw extending normally from its lower end shaped to correspond to the contour of opposite parts of the shaping block in which the bores are located and means near the upper ends of the arms for forcing the jaws toward the shaping block and a plurality of pins projecting inwardly from the jaws spaced to register with the bores in the shaping block.

9. A shaping block having a surface shaped to conform to the desired form of a plate to be placed thereon, and opposite edges at the base of said surface, said block being provided with a plurality of spaced bores near both of said edges, combined with a clamp comprising a pair of arms pivoted together intermediate their ends, each of said arms having a jaw extending normally from its lower end, means near the upper ends of the arms for forcing the jaws toward the shaping block, and a plurality of pins projecting inwardly from the jaws a guide strip affixed to each jaw with channels formed at its edges, said pins having body portions bearing on the guide strip, truncated conical portions at one end of the body portions, cylindrical portions projecting from the smaller end of the conical portions, threaded stems at the other ends of the body portions passing freely through the guide plates and nuts on said stems having flanges extending into said channels.

10. A shaping block having a surface shaped to conform to the desired form of plates to be placed thereon, and opposite edges at the base of said surface, said block being provided with a plurality of spaced bores near both of said edges, a plurality of interconnected plates provided with perforations near opposite edges thereof, spaced to correspond to the positions of said bores, combined with clamps each comprising a pair of arms pivoted together intermediate their ends, each of said arms having a jaw extending normally from its lower end, means near the upper ends of the arms for forcing the jaws toward the shaping block, and a plurality of pins projecting inwardly from the jaws a guide strip affixed to each jaw with channels formed at its edges, said pins having body portions bearing on the guide strip, truncated conical portions at one end of the body portions, cylindrical portions projecting from the smaller end of the conical portions, threaded stems at the other ends of the body portions passing freely through the guide plates and nuts on said stems having flanges extending into said channels.

11. A shaping block having a surface shaped to conform to the desired form of a plate to be placed thereon, and opposite edges at the base of said surface, said block being provided with a plurality of spaced bores near both of said edges, combined with a clamp comprising a pair of arms pivoted together intermediate their ends, each of said arms having a jaw extending normally from its lower end, means near the upper ends of the arms for forcing the jaws toward the shaping block and a plurality of pins projecting inwardly from the jaws, spaced to register with the bores in the shaping block, a guide strip affixed to each jaw with its edges bent over to form channels, said pins having body portions bearing on the guide strip, truncated conical portions at one end of the body portions, cylindrical portions projecting from the smaller end of the conical portions arranged to pass through the perforations in the plates into the bores in the shaping block, threaded stems at the other ends of the body portions passing freely through the guide plates and nuts on said stems having flanges extending into said channels.

References Cited in the file of this patent

UNITED STATES PATENTS

| Number | Name | Date |
|---|---|---|
| 168,007 | Emerson | Sept. 21, 1875 |
| 507,878 | Brown | Oct. 31, 1893 |
| 2,332,926 | May | Oct. 26, 1943 |
| 2,460,483 | Berliner | Feb. 1, 1949 |
| 2,465,872 | Heath | Mar. 29, 1949 |
| 2,619,045 | Dean | Nov. 25, 1952 |
| 2,696,241 | Larsen | Dec. 7, 1954 |

FOREIGN PATENTS

| Number | Country | Date |
|---|---|---|
| 543,040 | Great Britain | Feb. 6, 1942 |